Jan. 30, 1962 H. W. HOSBEIN 3,018,495
LOADING DOCK
Filed Sept. 14, 1956 2 Sheets-Sheet 2
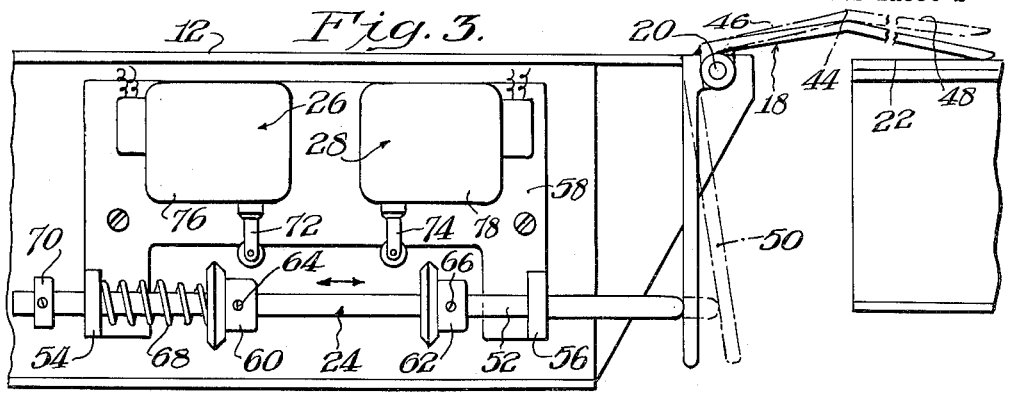
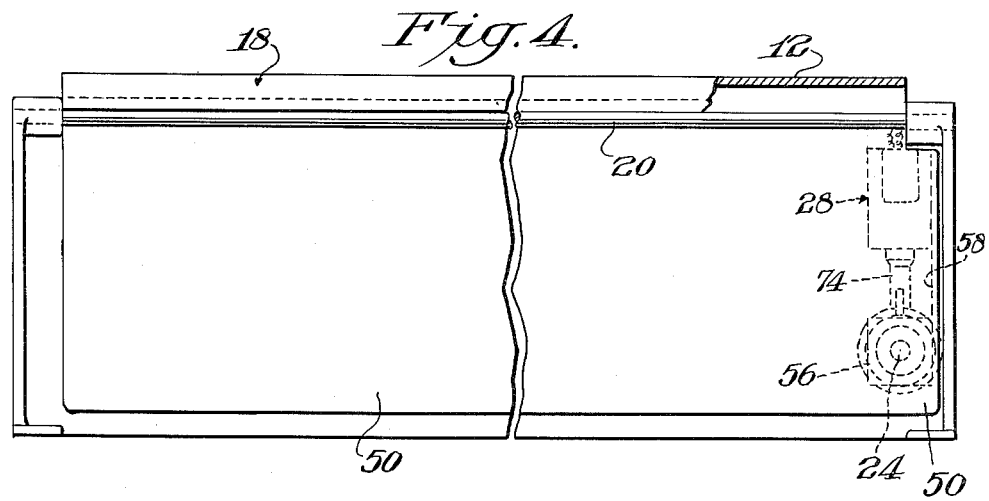
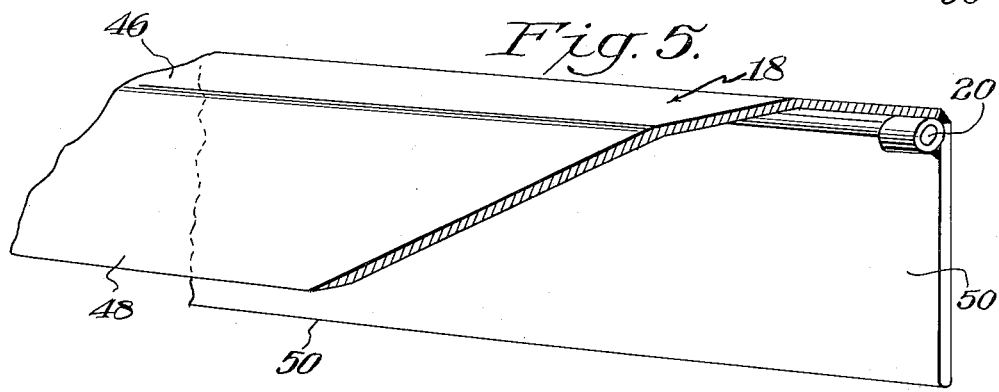
INVENTOR:
HUGH W. HOSBEIN
BY
HIS ATTORNEY

# United States Patent Office 3,018,495
Patented Jan. 30, 1962

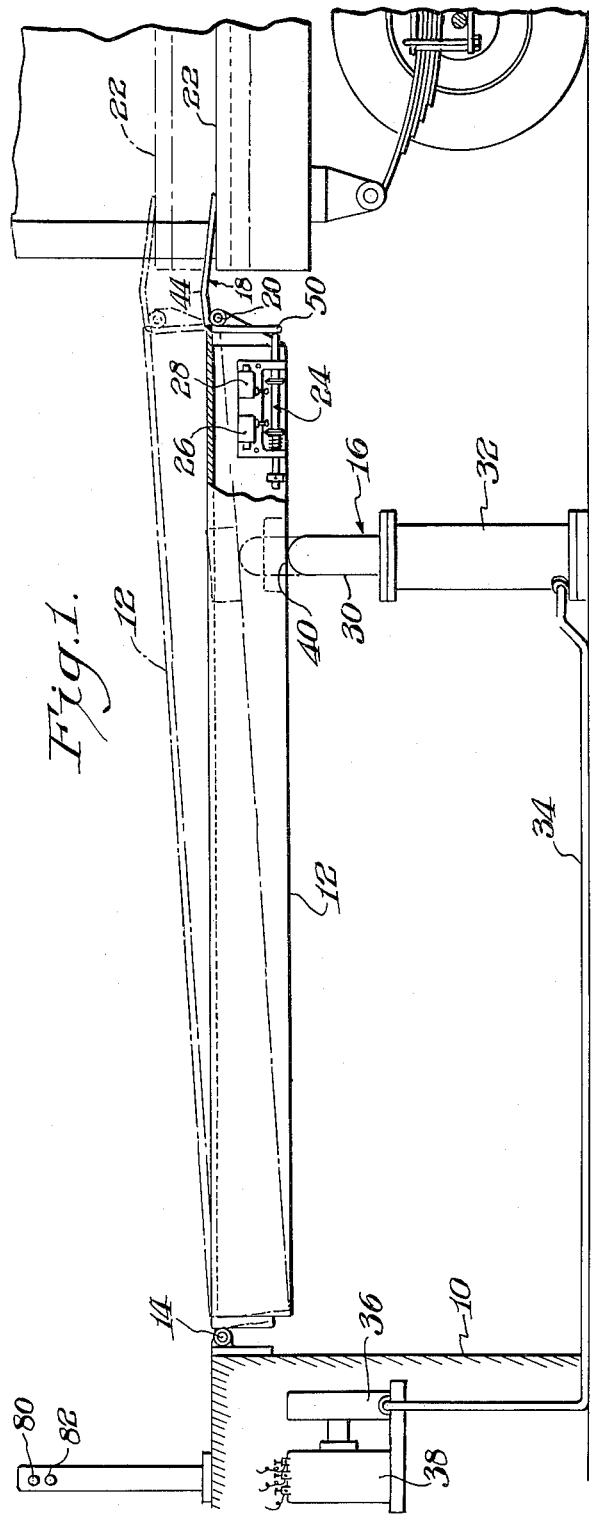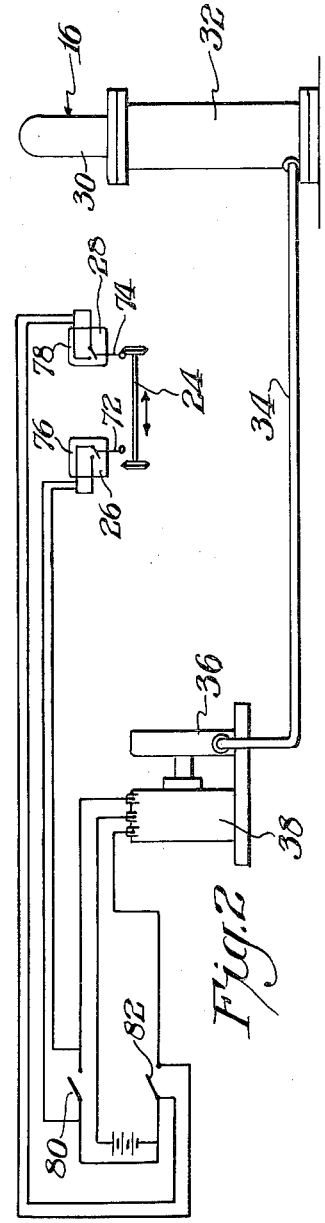
INVENTOR:
HUGH W. HOSBEIN
BY T. Wallace Quinn
HIS ATTORNEY

3,018,495
LOADING DOCK
Hugh Warren Hosbein, Fort Wayne, Ind., assignor to Symington-Wayne Corporation, Salisbury, Md., a corporation of Maryland
Filed Sept. 14, 1956, Ser. No. 609,957
4 Claims. (Cl. 14—71)

This invention relates to a new and improved power actuated loading dock of the type bridging the space between a dock and the deck of a vehicle such as a truck. More particularly, the loading dock of the present invention provides for automatically controlling dock ramp elevation necessitated as a result of variation in the height of the deck surfaces of vehicles.

Loading docks of the type including a dock, a dock ramp pivotally mounted at one end on the dock, a bridge member fixed to the other end of the dock ramp and power means for raising and lowering the other end of the dock ramp are in common usage. One difficulty common to most of these prior art loading docks is the lack of automatic compensation for variation in the height of the deck surfaces of vehicles. Variation in a given vehicle deck surface height results from, for example, changes in weight supported by the vehicle deck because of loading or unloading operations. Of the particular prior art loading docks which have provided means for compensating for variation in the height of deck surfaces of vehicles, most of them suffer from the disadvantage, at one elevation or another, of improper angular relation between the deck surface of the bridge member and the deck surfaces of the vehicle or the dock ramp.

In accordance with the present invention, an improved loading dock of the aforesaid type is provided by the use of means automatically compensating for variation in truck bed height while simultaneously maintaining the angulation of the vehicle bridge member relative to the deck of the vehicle as well as the deck of the dock ramp at minimum values consistent with ease of loading truck movement across the dock ramp and into the vehicle.

In the drawings:

FIG. 1 is a side elevational view, partially in section, of one form of loading dock in accordance with the present invention;

FIG. 2 is a schematic diagram illustrating an electrical circuit and hydraulic system suitable for the purposes of the present invention;

FIG. 3 is an enlarged view of a portion of FIG. 1;

FIG. 4 is an end elevational view, partially broken away, of FIG. 3 as viewed from the right hand side thereof; and FIG. 5 is a perspective view, partially broken away, of a portion of the vehicle bridge member of FIG. 1.

The loading dock of the present invention includes a dock, a dock ramp pivotally mounted at one end on the dock, power means supporting the dock ramp for raising and lowering the other end of the dock ramp, a vehicle bridge member pivotally mounted at the other end of the dock ramp for resting on a vehicle deck, means associated with the vehicle bridge member and responsive to variation in angular pivotal position of the bridge member, and means operatively associated with the last means and the power means for actuating the power means in response to a predetermined change in angular position of the vehicle bridge member.

By virtue of the foregoing arrangement, a change in angular position of the vehicle bridge member in response to a change in the vehicle deck height actuates a mechanism which in turn either raises or lowers the power means supporting the dock member so as to compensate for such variation in height. The degree of change in angular position permitted by such an arrangement can be predetermined so as to be compatible with a minimum angular relation between the surface of the vehicle bridge member and the vehicle deck as well as the dock ramp deck so as to permit, for example, loading truck movement across the ramp and into the vehicle without undue difficulty. Such an arrangement also permits a minimum of raising or lowering of the ramp consistent with the choice of degree of minimum angular relationship desired.

In accordance with the preferred embodiment of the present invention as illustrated in the drawings and with particular reference to FIG. 1, the loading dock of the present invention includes a stationary or movable dock 10, a dock ramp 12 pivotally mounted at one end 14 on the dock 10, power means 16 supporting the dock ramp 12 for raising and lowering the other end of the dock ramp, a vehicle bridge member 18 pivotally mounted, as on rod 20, at the other end of the dock ramp 12 for resting on a vehicle deck 22, means 24 associated with the vehicle bridge member 18 and responsive to variation in angular pivotal position of that member, means 26 and 28 associated with means 24 and the power means 16 for activating the power means in response to a predetermined change in angular position of the vehicle bridge member 18.

More specifically, the power means 16 of this embodiment includes a piston and piston rod 30, a hydraulic cylinder 32 for said piston and piston rod 30, inlet and outlet conduit 34 for hydraulic fluid from pump and reservoir 36 and a reversible motor 38 connected to pump and reservoir 36. Upon actuation of the motor in one direction, fluid is pumped into cylinder 32 by pump 36 via conduit 34 to raise piston rod 30 received universally by a recessed member 40 of ramp 12 and thereby raise the dock ramp 12. Upon reversal of the motor 38, fluid is withdrawn from cylinder 32 via conduit 34, and the weight of dock ramp 12 causes piston and piston rod 30 to descend into cylinder 32 thereby lowering dock ramp 12.

Vehicle bridge member 18 preferably comprises, as shown more clearly in FIGS. 4 and 5, an angular shaped member or extension pivotally mounted on rod 20, the latter being supported by the dock ramp 12 in known fashion. Preferably, the leg 44 of the angular vehicle bridge member 18 includes an outwardly extending portion 46 terminating in an outwardly and downwardly extending portion 48. The other leg 50 of vehicle bridge member 18, preferably and as shown in FIG. 1, is of a length less than leg 44 for reasons which will become more evident hereinafter.

With reference in particular to FIG. 3, means 24 associated with the vehicle bridge member 18 and responsive to variation of the angular pivotal position of that member comprises an operator rod 52 mounted for longitudinal movement in guides 54 and 56 which are in turn supported on plate 58 fixed to the underside of dock ramp 12, actuating projections 60 and 62 fixed to rod 52 and adjustably positionable along the length of rod 52 by set screws 64 and 66, a spring 68 in compression surrounding rod 52 between cam 60 and guide 54, and a stop 70 on the outer end of rod 52 permitting limited movement of rod 52 to the right as viewed in FIG. 3.

With reference to FIG. 3 it will be seen that if vehicle deck 22 raises, for example as a result of unloading the vehicle, vehicle bridge member 18 rotates about the axis of rod 20 in a counterclockwise direction to, for example, the position indicated in phantom. As a result of such movement, operator rod 52 is moved to the right as viewed in FIG. 3 by the force of spring 68 permitted to act as the result of the absent counteracting force through leg 50 of the weight of vehicle bridge member 18. Conversely, if the height of vehicle deck 22 is reduced as a result, for example, of loading the vehicle, vehicle bridge member 18 rotates in a clockwise direction about the axis of rod 42 and the resultant force applied by leg 50 overcomes the force of spring 68 and urges rod 52 to the left as viewed in FIG. 3. From the foregoing description, it will readily be appreciated that the counteracting forces of the weight of vehicle bridge member 18 and spring 68 are selected so as to maintain the deck of vehicle bridge member 18 at a minimum angle with reference to the deck of dock 12. Such arrangement assures easy passage of a loading truck over the dock ramp and into the vehicle or vice versa. The preferred longer length of leg 44 as compared with the length of leg 50, for example a 3 to 1 ratio, permits a mechanical advantage allowing a relatively large vertical change in the height of vehicle deck 22 as compared with the movement of rod 52. This feature taken in connection with the adjustable positioning of cams 60 and 62 allows selective adjustment of the rise and fall of ramp 12 in response to a rise or fall in the height of vehicle deck 22.

Actuating projections 60 and 62 operate, respectively switch actuating arms 72 and 74, upward movement of either of these actuating arms closing contact electrical switches located in housings 76 and 78 respectively and diagrammatically illustrated in FIG. 2. Closing the switch of housing 76 by the upward movement of switch arm 72, actuates motor 38 in a direction to pump fluid via conduit 34 into cylinder 32 and raise dock ramp 12. Upward movement of switch arm 74 closes the switch of housing 78 and reverses the direction of motor 38 so as to pump fluid from cylinder 32 via conduit 34 and lower dock ramp 12.

For the purpose of raising or lowering dock ramp 12 when backing a vehicle up to the dock ramp or removing the vehicle from the dock ramp, manually operated switches 80 and 82 may be provided, actuation of switch 80 raising and switch 82 lowering the dock ramp 12 as will be more apparent upon considering FIG. 2.

Depending upon the nature of the goods being loaded or unloaded across the loading dock of the present invention and other factors such as the type of loading truck moving across the loading dock and into the vehicle, it may be desirable to change the minimum angular relationship between the deck of the vehicle bridge member and the decks of the vehicle or the dock ramp. In accordance with the present invention, this may be accomplished. With reference to the specific embodiment thereof the farther the distance between actuating projections 60 and 62, the greater the amount of increase or decrease of the height of vehicle deck 22 permitted without automatically raising or lowering the position of dock ramp 12. Conversely, the smaller the distance between these projections, the less the change in height of the vehicle deck 22 permitted without automatically raising or lowering the position of dock ramp 12. Similarly, the greater the length of leg 44 relative to the length of leg 50, the greater the change in height of vehicle deck 22 permitted without automatically raising or lowering the position of dock ramp 12.

A feature of particular importance in connection with the above loading dock is the arrangement of vehicle bridge member 18 and operator rod 52 and its associated structure which permits all electrical circuits to remain open when removing the vehicle from the dock ramp. Thus, when the vehicle moves away from the dock ramp, vehicle bridge member 18 rotates in a clockwise direction about the axis of rod 20 so fast relative to the gradual controlled rate of lowering of the ramp that it moves operator rod 52 to the extreme left as viewed in FIG. 3 such as to permit the lowering actuating projection 62 to slip past the actuating arm 74 of lowering switch 28. As a result, both projections 60 and 62 do not contact switch arms 72 and 74 and hence, the electrical switches of housings 76 and 78 remain open. Accordingly, the loading dock ramp remains locked at its existing level until moved by operation of switches 80 and 82 or manual lifting of vehicle bridge member 18 to operate either of the switches in housings 76 and 78. Lowering of the ramp is accomplished when the downward rate of movement of extension 18 relative to ramp 12 is controlled and slow enough to allow the gradual lowering of movement of the power support means (which includes motor 38, pump 36, cylinder 32 and piston 16) to allow lowering actuating projection 62 to remain in actuating contact with lowering switch arm 74.

The foregoing description of a specific embodiment of the present invention is for the purpose of illustration only and is not limiting to the scope thereof which is set forth in the claims.

I claim:

1. An automatically adjustable ramp for bridging the space between two separated surfaces of changing relative height comprising a movable power support means, hinge means connecting said ramp adjacent to the edge of one of said surfaces, an extension for contacting the other of said surfaces, motion-permitting means movably supporting said extension at the end of said ramp adjacent said other of said surfaces for causing said extension to move upwardly and downwardly in contact with said other surface relative to said ramp, a control element, a movable connection mounting said control element upon said ramp, coupling means operatively connecting said extension with said control element for moving said control element to and fro in response to upward and downward movement of said extension relative to said ramp, a pair of contact switches mounted upon said ramp adjacent said control element, a switch actuating arm attached to each of said contact switches, electrical circuit means connecting said switches to said movable power support means, one of said switches when actuated causing said power support means to lower said ramp thereby constituting it as a lowering switch, the other of said switches when actuated causing said power support means to raise said ramp thereby constituting it as a raising switch, said power support means holding said ramp motionless when both of said switches are unactuated, a pair of actuating projections mounted upon said control element at a spacing greater than the distance between said switch actuating arms, said coupling means being arranged to maintain said actuating projections with said switch actuating arms disposed unactuated between them when said other surface is substantially aligned with said ramp, said switches remaining unactuated when their actuating arms are not contacted by said actuating projections, said actuating projections respectively disposed adjacent said lowering and said raising switch actuating arms being respectively designated as lowering and raising actuating projections, said coupling means moving said lowering actuating projection into actuating contact with said lowering switch actuating arm when said extension is moved downwardly relative to said ramp, the rate of said power support means being gradual when said ramp is being lowered to allow said lowering actuating projection to remain in actuating contact with said lowering switch actuating arm when said extension moves slowly downwardly at a controlled speed, said coupling means moving said raising actuating projection into actuating contact with said raising switch actuating arm when said other surface moves upwardly relative to said ramp, and said lowering actuating projection being movable past said lowering switch actuating arm to cause said lowering actuating projection to slip past said lowering switch actuating arm to cause it to assume the unactuated condition upon a sudden downward relative movement of said other surface relative to said ramp caused by said extension moving downwardly faster than said power support means is lowering said ramp whereby said power support means is stopped to hold said ramp motionless when said extension is moving downwardly too fast for safety.

2. An actuating arrangement as set forth in claim 1 wherein said extension comprises an angular plate having horizontal and vertical legs, said motion-permitting means comprising a hinge which mounts said angular plate at the junction of its legs to said ramp to cause said horizontal leg to rest upon said other surface when said ramp lies adjacent it, said vertical leg contacting said control element to move it in one direction when said horizontal leg moves upwardly with said other surface and in the other direction when said horizontal plate moves downwardly with said other surface, and a resilient means reacting between said ramp and said control element for urging it toward said vertical leg.

3. An actuating arrangement as set forth in claim 2 wherein said control element comprises a rod, said movable connection comprises bearings which mount said rod to slide to and fro, and a spring reacts between said rod and said ramp in a direction to urge said rod to raise said horizontal leg.

4. An actuating arrangement as set forth in claim 2 wherein said horizontal leg of said angular plate is as wide as said ramp and forms a continuation of said ramp to provide a bridge from said ramp to said other surface.

References Cited in the file of this patent
UNITED STATES PATENTS

| | | |
|---|---|---|
| 980,522 | Haywood | Jan. 3, 1911 |
| 1,279,967 | Barlow | Sept. 24, 1918 |
| 2,449,829 | Agren | Sept. 21, 1948 |
| 2,489,869 | Dunn | Nov. 29, 1949 |
| 2,644,971 | Rowe | July 14, 1953 |